United States Patent [19]
Chula et al.

[11] Patent Number: 5,808,450
[45] Date of Patent: Sep. 15, 1998

[54] SPECIAL ALTERNATOR ASSEMBLY WITH AN INHERENT BALLAST IMPEDANCE CHARACTERISTIC FOR LIGHTING SYSTEMS

[75] Inventors: Stanley S. Chula, Rothschild; Gary L. Schurter, Wausau; Lowell R. Stuebinger, Schofield, all of Wis.; Thomas H. Coleman, Jr., Germantown, Tenn.

[73] Assignee: Marathon Electric Manufacturing Corporation, Wausau, Wis.

[21] Appl. No.: 698,134

[22] Filed: Aug. 15, 1996

[51] Int. Cl.$^6$ ........................................................ H02P 9/00
[52] U.S. Cl. .................. 322/22; 322/1; 315/160; 362/192; 362/238
[58] Field of Search ...................... 322/1, 22, 8; 315/160; 362/192, 184, 250, 238

[56] References Cited

U.S. PATENT DOCUMENTS

| | | |
|---|---|---|
| 465,594 | 12/1891 | Roche . |
| 1,934,576 | 11/1933 | Watts ........................................ 240/1.2 |
| 2,360,420 | 10/1944 | Hill ........................................... 240/1.2 |
| 3,345,507 | 10/1967 | Messinger ............................... 240/10.5 |
| 3,936,670 | 2/1976 | Allen, Sr. ................................. 240/41.3 |
| 4,360,860 | 11/1982 | Johnson et al. ........................... 362/192 |
| 4,574,219 | 3/1986 | Davenport et al. ....................... 315/49 |
| 4,904,903 | 2/1990 | Pacholok .................................. 315/307 |
| 4,914,373 | 4/1990 | Rivkine ..................................... 322/1 |

Primary Examiner—Steven L. Stephan
Assistant Examiner—Nicholas Ponomarenko
Attorney, Agent, or Firm—Andrus, Sceales, Starke & Sawall

[57] ABSTRACT

An engine-driven alternator assembly includes an output winding having an internal impedance characteristic similar to a separate stationary ballast for high intensity discharge lamps. The output winding is direct connected to lamps in a mobile light tower application having four HID lamps. The alternator assembly includes four separate alternator units each having an output winding wound to establish the inherent internal impedance to provide a ballast source for the connected lamp. Each alternator unit has its rotor mounted on a common shaft connected to the shaft of the engine. Each alternator unit establishes an open circuit voltage to strike an arc across the HID lamp and then a sustaining voltage to maintain current flow as well as limiting the current to the lamp. The alternator unit has a high frequency output, preferably within 200 to 600 hertz. The alternator unit is a permanent magnet alternator, a switched reluctance alternator, an induction alternator, or a wound synchronous alternator. A full wave bridge may be connected across the alternator output to supply the limited direct current to the lamp, and the engine may be controlled to create the voltage change.

29 Claims, 13 Drawing Sheets

SPECIAL ALTERNATOR ASSEMBLY WITH AN INHERENT BALLAST IMPEDANCE CHARACTERISTIC FOR LIGHTING SYSTEMS

FIELD OF THE INVENTION

This invention relates to a special alternator assembly with an inherent ballast impedance characteristic for lighting systems and particularly to such an alternator assembly which is adapted to be connected to drive high intensity lamps in which the lamp current tends to cease during each change in polarity of each cycle of the alternating current supply.

BACKGROUND OF THE INVENTION

High intensity lighting systems are useful in many applications. One application is a mobile light tower having an engine driven electric alternator to power a set of four or six high-intensity-discharge (HID) lamps such as metal halide lamps mounted at the top end of a retractable boom. Such a system can provide high-intensity illumination within a selected area. Mobile light towers are particularly useful for nighttime road construction, local sporting events, and other applications where permanent lighting is not available.

HID lamps generally include various metal vapor lamps, such as metal halide lamps, typically have an internal arc tube made of quartz. The quartz arc tube is located within a glass bulb. The arc tubes contain a metal vapor and operate under high pressure (greater than 5 atmospheres) and temperature (greater than 900° C.). A filament is located between electrodes in the lamp, the filament is used to heat the metal vapor within the arc tube during warm up. The nominal arc strike voltage in a metal halide lamp is approximately 450 volts. Once the arc is present, a plasma develops within the tube, and the operating voltage of the lamp reduces to approximately 240 volts.

Lighting systems having metal halide lamps and other such HID lamps typically use single phase electrical AC power from 120 to 600 volts, 60 Hz (hertz) from either a utility power supply or from an alternator unit, with a separate ballast unit for each lamp required for establishing and maintaining lamp operation. The power supply is a low impedance source to allow the connection of the lamps to the single source. The ballast unit is connected between the power supply and the lamp. The ballast serves three purposes. First, the ballast acts as a matching transformer to increase or decrease the line voltage to the nominal arc strike voltage of 450 volts. Second, the ballast is a current limiting device. Excessive currents will shorten the life or may damage the lamp. However, the lamp itself typically has minimal current limiting characteristics which is not capable of limiting the current flow. The impedance of the lamp decreases when the arc is initiated and then increases gradually to a steady state lamp operating state. The separate ballast provides sufficient impedance in the circuit so that the current does not exceed a maximum value for the lamp. Third, the separate ballast increases the slope of the AC voltage wave at the zero crossing point at every half cycle of the current wave. The zero crossing slope of a 60 Hz sine wave is generally not sufficient to sustain an arc within the lamp. Therefore, the separate ballast connected between the source and the lamp is used to increase the zero crossing slope of the voltage to maintain the lamp current.

Various rather costly, bulky and heavy ballast units have heretofore been used between the alternator and the lamp or lamps. Although sole inductive impedance devices have been suggested and used, a more complex inductive/capacitive ballast unit is often recommended for use particularly with metal halide lamps. For example, a publication of American National Standards Institute (1430 Broadway, New York, N.Y. 10018) discusses the various ballast devices suggested for use with metal halide lamps. A copy thereof is attached as an Appendix to its publication ANSI C781376-1990 entitled "American National Standard For Electric Lamps—1000 watt M47 Single-Ended Metal Halide Lamps". The Appendix discloses in addition to an inductive element, four other circuits, each of which includes some inductor and a capacitor. A typical unit consists of an autotransformer with a capacitor connected in circuit with the autotransformer and the lamp to produce the desired characteristic including the desired strike voltage and sustaining voltage in combination with the appropriate current limiting impedance.

In addition to alternators, various solid state electronic devices including inverter units have been suggested for connecting of a conventional 60 Hz utility power supply to energize the high intensity lamps. A typical supply consists of a pulse width modulated inverter with appropriate switching controls to produce frequencies of up to 2 megahertz for energizing of the lamps and with the appropriate striking and the sustaining voltage outputs. One inverter system is disclosed in a paper presented at a conference in Tokyo, Japan. The inverter is described in the published papers of the power conversion conference entitled "Official Proceeding of the first PCIM of 1988" and available from PCIM Manage of Tokyo, Japan. The paper appears at pages 73–81 of the Official Publication. As disclosed therein, the inverter includes an inductive/capacitive resonant circuit to generate a generally sinusoidal signal of a high frequency for energizing of the lamps. The system was applied to low wattage HID lamps to avoid acoustic resonance.

Present inverter systems have not, however, been particularly adapted to mobile power supplies to date, and engine driven alternators mounted on a trailer or vehicle are widely used for various applications and particularly lighting towers and the like.

In prior art mobile light tower applications, four lamps are typically used in conjunction with four separate ballasts each connecting one of the lamps to the output of one engine driven 120/240 volt 60 Hz synchronous alternator. Such synchronous alternators are readily available in the market. Such synchronous alternators usually have a low impedance in combination with voltage regulator, using a capacitor or a transformer, to maintain the output voltage from the alternator as the load changes.

Voltage regulation devices and ballasts increase the cost of lighting systems, and also provide for the possibility of additional component failure in the system.

SUMMARY OF THE INVENTION

The invention is a lighting system that eliminates the need for ballast and voltage regulation in the system. The invention does this by providing an alternator assembly having internal impedance characteristics similar to the separate stationary ballast, and transmitting electrical AC power from the alternator usable for direct connection to an associated lamp. In a mobile light tower application, the system preferably has a plurality of lamps and each lamp has a dedicated alternator winding that outputs electrical AC power suitable for direct supply to the lamp.

Generally, the prior art alternator units have been wound within minimal or low impedance in the alternator output windings. The output winding is then readily applied to a plurality of loads while maintaining the desired output voltage. In contrast, the present invention deliberately increases the inherent or internal impedance characteristic significantly and substantially above the conventional impedance characteristic to produce an A.C. output having an inherent lamp ballasting characteristic. This, in combination with the higher frequency, produces an output uniquely adapted for effective and efficient driving of high intensity discharge lamps and the like loads.

In accordance with the present invention, an alternator unit has the output winding wound to establish an inherent internal impedance to provide a ballast impedance source for operating the lamp. Thus, the output winding impedance characteristic is of the same general nature as the prior art separate devices. The output voltage from the alternator unit is not constant. Initially, the open circuit voltage from the alternator unit is sufficient to strike an arc across the lamp, for example, 450 to 500 volts. However, after the arc is present in the lamp, the terminal voltage across the alternator unit falls to an operating voltage of about 240 volts due to the internal impedance within the alternator and the presence of the load. In addition, although the present invention may be useful over a wide range of frequency, the AC output from the alternator preferably has a high frequency, preferably in the range of 200 to 600 Hz. Alternators can be readily constructed for generating frequencies up to 1,000 to 2,000 Hz, and in fact, are really limited only by the physical construction of the various components. The inventors have found that operating in a range of 200 to 600 Hz is a particularly practical range and that an operating range of 500 to 550 Hz has been used with present day HID lamps and particularly metal halide lamps. The high frequency AC output particularly has a voltage wave shape which is sufficient to supply voltage to sustain the current for proper lamp operation.

The present invention thus provides a special alternator assembly having an inherent impedance characteristic for limiting of the current of the lamp and also maintaining of lamp operation without the necessity of any separate substantial ballast unit. Thus, the alternator assembly includes an alternating current output adapted to power a lamp having a minimal operating impedance in an alternating current lighting system. The alternator assembly includes at least one winding connected to the lamp. The inherent impedance of the winding limits the current in the lamp and establishes both an initiating or strike voltage for initiating current flow through the high intensity lamp and thereafter a sustaining voltage to maintain normal operation of the lamp and in particular to prevent the current turn-off at the zero crossover of lamp current in changing from one polarity to the alternate polarity associated with an alternating current. Thus, the alternator unit further provides for a high AC turn-on voltage for lamp turn-on and a reduced sustaining voltage to thereafter maintain the lamp on. In this regard, the voltage wave shape, which is substantially in phase with the current provides a voltage at or near the zero current point or cross over which maintains or re-establishes the current flow in the reverse direction. The winding is wound and constructed with an inherent impedance characteristic for current limiting and with the necessary voltage characteristic for maintaining lamp operation without any separate substantial ballast or impedance. In a preferred construction, a separate winding is provided dedicated to each lamp to be energized, and each winding is preferably formed as a part of a separate alternator unit having its own rotor and high impedance output winding.

The system has been particularly applied to a mobile lighting system in which an internal combustion engine, particularly such as a diesel engine, was connected to drive the alternator unit. The mobile unit was particularly applied to a multiple high intensity lamp module including four lamps. The alternator assembly included four separate alternator units, and particularly of a permanent magnet generator or alternator construction. Thus, four stators with the special inherent impedance characteristic windings were secured within the housing in axially spaced relation. Individual rotors are mounted on a common shaft and mounted with the rotors in alignment within the alternator stator units. The internal combustion engine was coupled to drive the shaft and thereby simultaneously activate and energize and operate each of the alternator units. The output winding of each alternator unit was direct connected to the high intensity lamp, particularly a metal halide lamp. The unit initiated and maintained exceptionally optimal continued operation of the lamp module without the necessity of interpositioning of any separate ballast unit or other auxiliary circuit modifying forces or devices other than the normal turn-on and turn-off switching unit or units. As more fully developed hereinafter, the individual alternator units were specially constructed including the winding with the winding impedance limiting the current in the lamp, establishing a strike voltage to initiate operation of the lamp and thereafter a sustaining voltage to maintain continued operation of the lamp to rely solely on the winding impedance characteristic as the ballasting unit in the lighting system.

An object of the invention is that it eliminates the need for a conventional separate ballast in a lighting system. Another feature of the invention is that it eliminates the need for voltage regulation devices on the alternator output. Although the special alternator may generally eliminate the necessity of the special auxiliary equipment, such auxiliary devices may be used within the scope of the present invention, if deemed desirable for any reason.

Although the invention has been described so far in conjunction with metal vapor lamps, and in particular metal halide lamps, it should be recognized that the invention should not be so limited. The invention can be used advantageously in many lighting systems including but not limited to high pressure metal halide systems, low pressure metal halide systems, high pressure sodium or mercury systems, low pressure sodium systems, fluorescence systems, and even to a limited extent incandescent systems.

Generally, an alternator assembly as used herein defines an alternator construction including at least one high impedance output winding and a rotor for developing the alternating voltage and current particularly suitable to supply HID lamps requiring the striking and sustaining voltage and the ballast limited current. The alternating assembly may also include a plurality of high impedance windings for energizing of a like plurality of lamps and a plurality of alternator units each of which has a separate rotor and a separate output winding for energizing individual lamps of a like plurality of lamps.

While the preferred embodiment of the invention uses a diesel engine to drive a set of permanent magnet synchronous alternators, it should be readily apparent to those skilled in the art that other types of prime movers (for example gasoline engine, turbine, etc.) and electric alternators (e.g. wound field synchronous alternators, switched reluctance synchronous alternators, and induction alternators, etc.) can be constructed with an appropriate inherent ballast impedance.

DETAILED DESCRIPTION OF THE DRAWINGS

Figure 1:
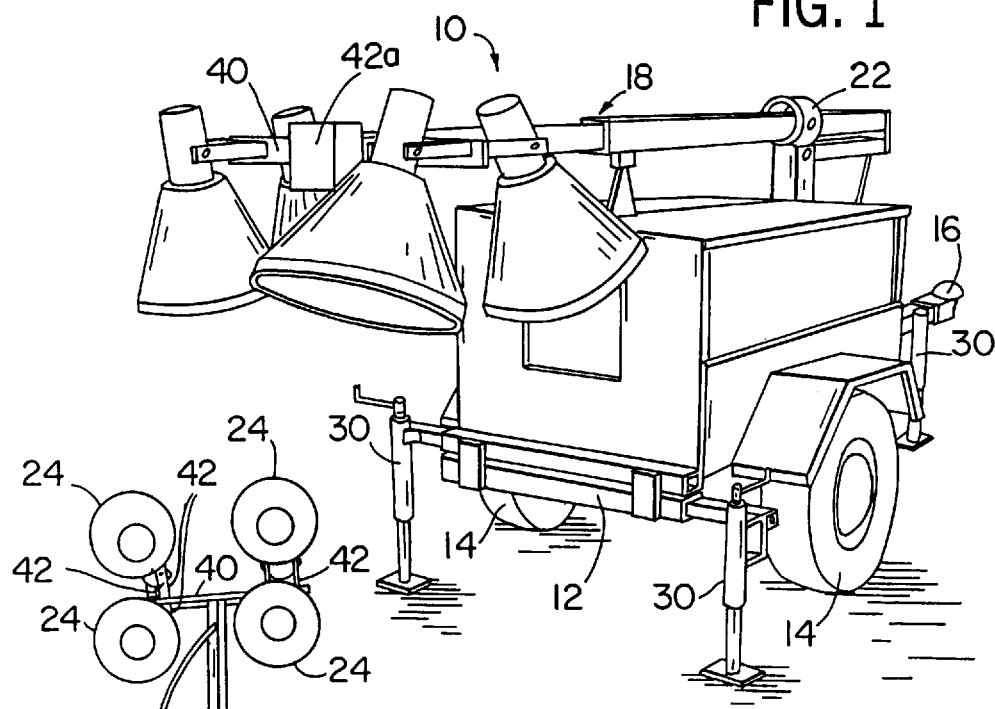
FIG. 1 is a schematic view of a mobile light tower having a set of four metal halide lamps and a boom that is retracted.
Figure 2:
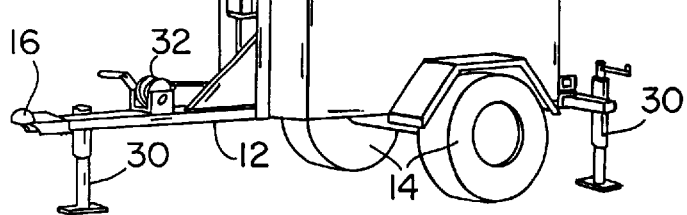
FIG. 2 is a schematic view of the mobile light tower shown in FIG. 1 with the boom extended so that the set of metal halide lights can be positioned for operation.

FIGS. 1 and 2 illustrate a mobile light tower 10. The mobile light tower 10 has a mobile frame structure 12 which is preferably a trailer having wheels 14 and a hitch 16. The mobile light tower 10 has a lighting assembly 18 mounted on the frame structure 12. The lighting assembly 18 has a retractable, telescoping boom. The lower end of the boom 20 is pivotally mounted to the frame structure 12 which a locking hinge 22. A set of four lamps 24, preferably metal halide lamps, are mounted to the far end of the retractable telescoping boom 20 opposite the hinge 22.

A source of electric AC power, preferably a prime mover such as a diesel engine driving a synchronous alternator assembly, is mounted on the mobile frame structure 12 within an alternator assembly housing 26. Typically, a fuel tank, a starter battery and a control panel are also included within the housing 26, not shown. Electrical AC power is provided from the power source and particularly from the alternator assembly to the lamps 24 through electrical power lines 28.

The illustrated mobile light tower 10 has three jacks 30 to support the frame structure 12 in the stationary position. To set up the mobile light tower 10 in preparation of operation of the set of lamps 24, the mobile light tower 10 is towed to a position where it is desirable to set up the light tower 10, and the jacks 30 are engaged. Then, a hand crank 32 is used to pull the boom 20 from a retracted position (FIG. 1) to an upright position (FIG. 2). The height of the lamps 24 can be adjusted by adjusting an inner telescoping boom member 34 within an outer telescoping boom member 36. A horizontal light support member 40 is mounted to the top of the inner telescoping boom member 34. The lamps 24 are attached to the horizontal support member 40 using a U-shaped bracket 42 so that the direction of the lamps 24 can be adjusted. An electrical box 42a (FIG. 1) is also mounted to the horizontal support member 40.

Figure 3:
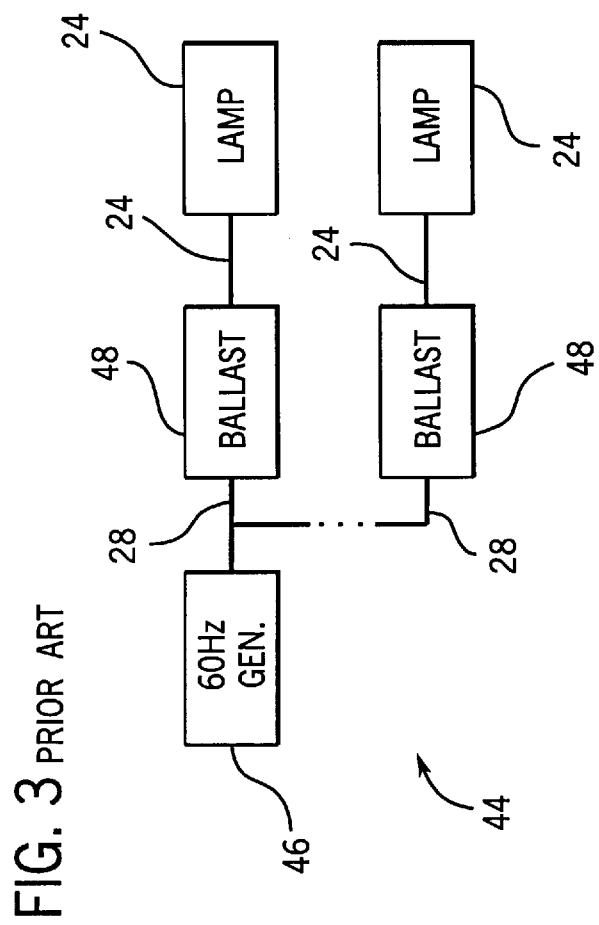
FIG. 3 is a line drawing illustrating the operation of prior art lighting systems.

Prior art lighting systems typically use lamps 24 each having a dedicated separate ballast connected between the one output of one alternator unit and the lamps. FIG. 3 schematically illustrates a typical lamps and the like. The typical prior art system 44 uses a conventional low impedance alternator which outputs regulated electrical power at a frequency of 60 Hz, preferably single phase electrical power at 120 volts. In most mobile applications, the alternator is driven by a diesel engine. The alternator is typically a four pole, brushless, self-regulated unit having a continuous rating of approximately 6,000 watts. The regulated electrical power from the 60 Hz alternator is transmitted through lines 28 to a separate ballast 48 for each lamp and then onto each lamp 24. The lamps 24 are preferably metal halide lamps having a total output of 4,000 watts and an initial lumens rating of 440,000. The ballasts 48 preferably include an autotransformer and core and coil ballasts, such as generally disclosed in the previously cited literature. The conventional ballast 48 is a relatively large unit of substantial weight and expense of the system 44. As described earlier, the ballasts 48 serve three purposes in the prior art lighting system 44. The conventional separate ballast 48 increases the voltage at system start-up to the nominal arc strike voltage of 450 volts. The ballast also provides sufficient impedance so that the current does not exceed a maximum value for the lamp. Third, the ballast increases the slope of the AC voltage wave through the zero crossing point as the current wave is at or near zero magnitude so that current flow through the lamp is to maintain a continuous output.

The present invention provides for an alternator construction which eliminates the need for the conventional separate ballast in a lighting system for high intensity lamps and the like.

Figure 4:
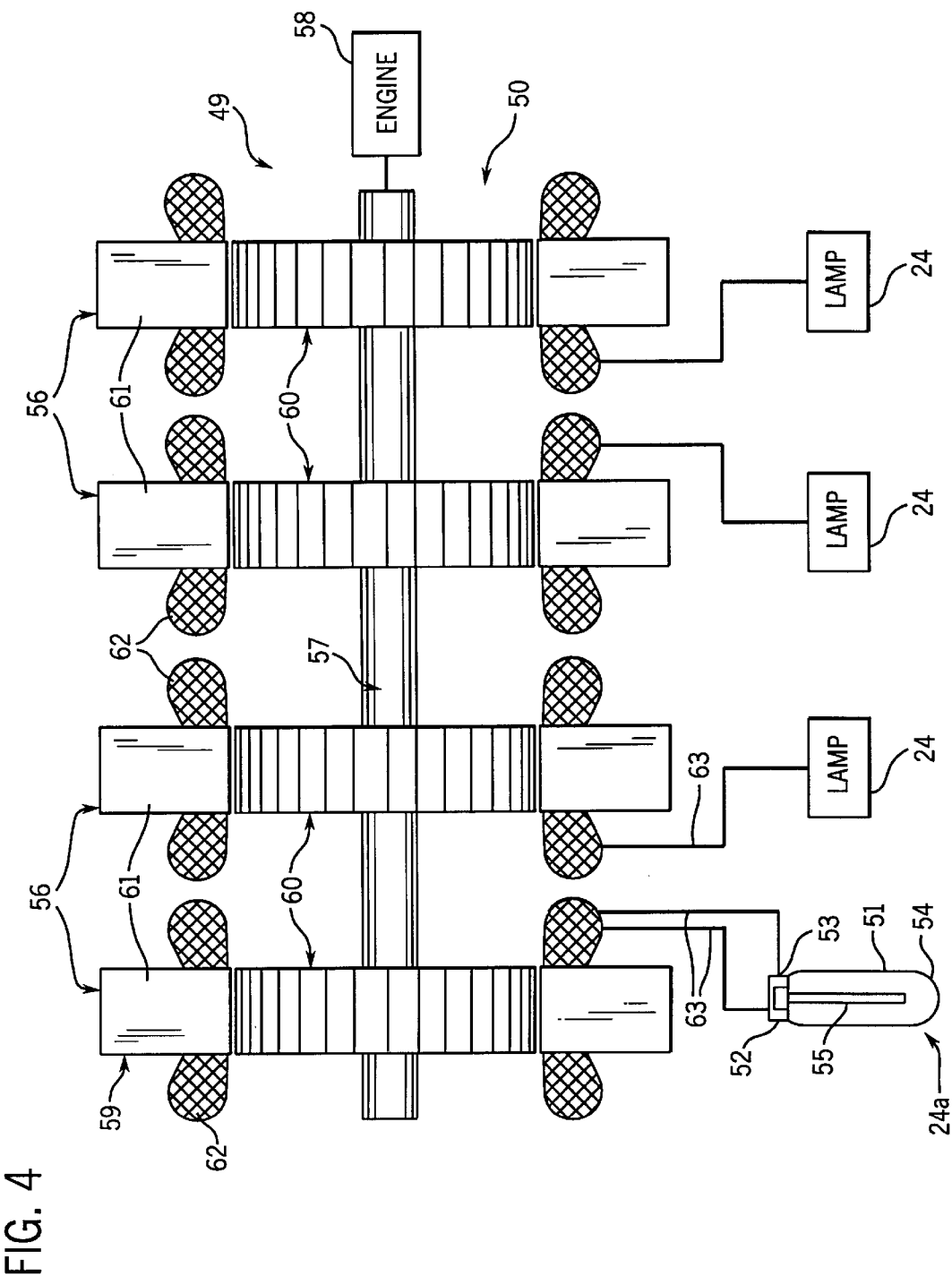
FIG. 4 is a schematic illustration of the preferred embodiment of the present invention.

FIG. 4 schematically illustrates a lighting system 49 in accordance with the preferred embodiment of the invention, the conventional ballast being totally eliminated from the system.

A diagrammatically illustrated permanent magnet alternator assembly 50 is illustrated in FIG. 4. The illustrated alternator constructed to simultaneously drive and energize up to four high intensity lamps 24, and particularly as applied to metal halide lamps and the like.

Four individual separate lamps 24 are illustrated in FIG. 4, with only the one lamp 24a shown in typical simplified illustration. Lamp 24a, as illustrated in FIG. 4, includes an outer glass enclosure 51 with an electrical connecting base 52 at one end. Spaced electrodes 53 and 54 within enclosure 51 has a current flow 53 established therebetween to produce light.

The alternator assembly 50 includes four alternator units 56, one for each lamp 24 to be energized. The alternator units 56 are mounted on a common shaft 57 coupled to a suitable drive engine 58, typically a diesel engine. Of course, any other form of prime mover may be used, which will operate the alternator assembly at an appropriate RPM, particularly at a selected constant speed in accordance with output requirements.

More particularly, each alternator unit 56 includes a stator 59 and a rotor 60 mounted on the shaft 57.

The stator 59 includes a laminated annular core 61 with a distributed multi-coil winding 62 wound on the inner peripheral surface. In the present invention, the winding 62 is specially constructed and particularly wound to produce, in combination with the rotor 60, a high frequency output voltage and current which is uniquely adapted to drive a high intensity lamp. Thus, the output frequency and voltage of the alternator unit is related to the number and distribution of the winding coils and the number of rotor poles as hereinafter developed. The engine drives the rotor at designed revolutions per minute (RPM) to generate a particularly high frequency, particularly suited for establishing a striking voltage for initiating a conduction of the high intensity lamp and thereafter establishing a sustaining voltage to maintain the ignited lamp. The stator winding 62 is specially wound with a uniquely high impedance characteristic related to the lamp characteristic to directly function as an internal ballast unit establishing proper voltages and current limiting to maintain stable and effective operation of the direct connected high intensity lamps. The winding 62 of the alternator unit 56 in the illustrated embodiment has its leads 63 connected directly to the connecting base 62 of the high intensity lamp. A switching unit, not shown, is provided in the circuit connection for selectively operating one or all lamps, simultaneously or in any sequence.

All alternator units 56 are similarly constructed and connected to the respective related lamps 24 and provide direct energization and operation of the respective lamps. Thus, in the illustrated embodiment of the invention, the separate ballast unit is not shown or necessarily introduced into the circuit between the alternator output and the lamp. In accordance with the present invention, the internal and inherent impedance characteristic of the alternator unit and particularly winding 62 is designed to limit the current of the AC alternator output in such a manner that the current will not exceed a desired or maximum current value during the operation for the high intensity lamp, as well as providing the strike voltage and the subsequent sustaining voltage without other interposed interacting devices or controls required.

The alternator units 56 are preferably permanent magnet generators in which each rotor is constructed with distributed permanent magnets to generate an appropriate output from winding 62. The rotor, as fully developed hereinafter, is preferably a permanent magnet rotor constructed in accordance with the teaching of the application filed by Stanley S. Chula, entitled "Dynamo Electric Machine With Permanent Magnet Rotor Structure", filed on Dec. 11, 1995 with Ser. No. 08/570,095, and assigned to a common assignee.

Figure 5:
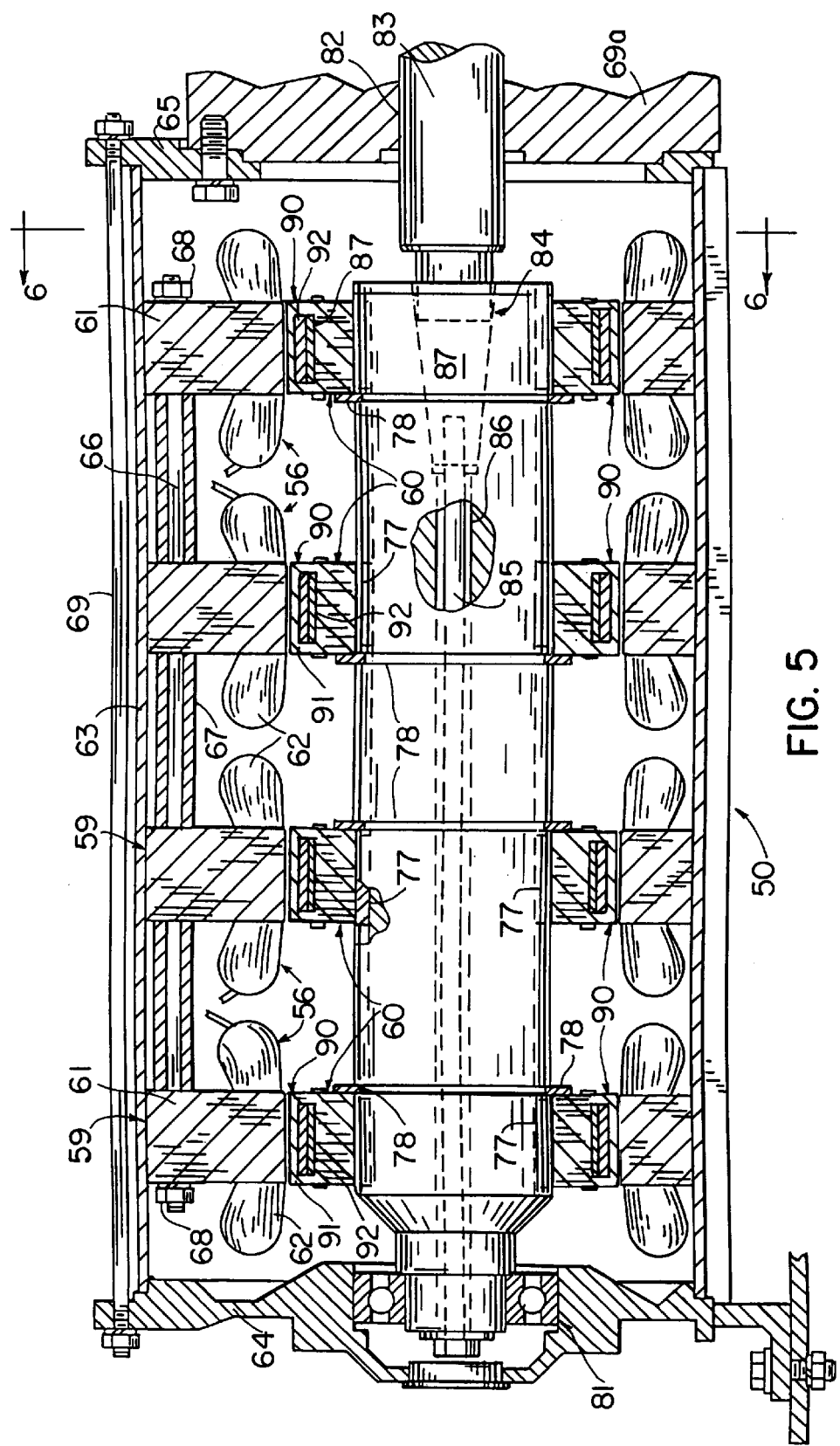
FIG. 5 is a sectional view of an alternator assembly depicted schematically in FIG. 4 and taken generally along line 5—5 in FIG. 6.
Figure 6:
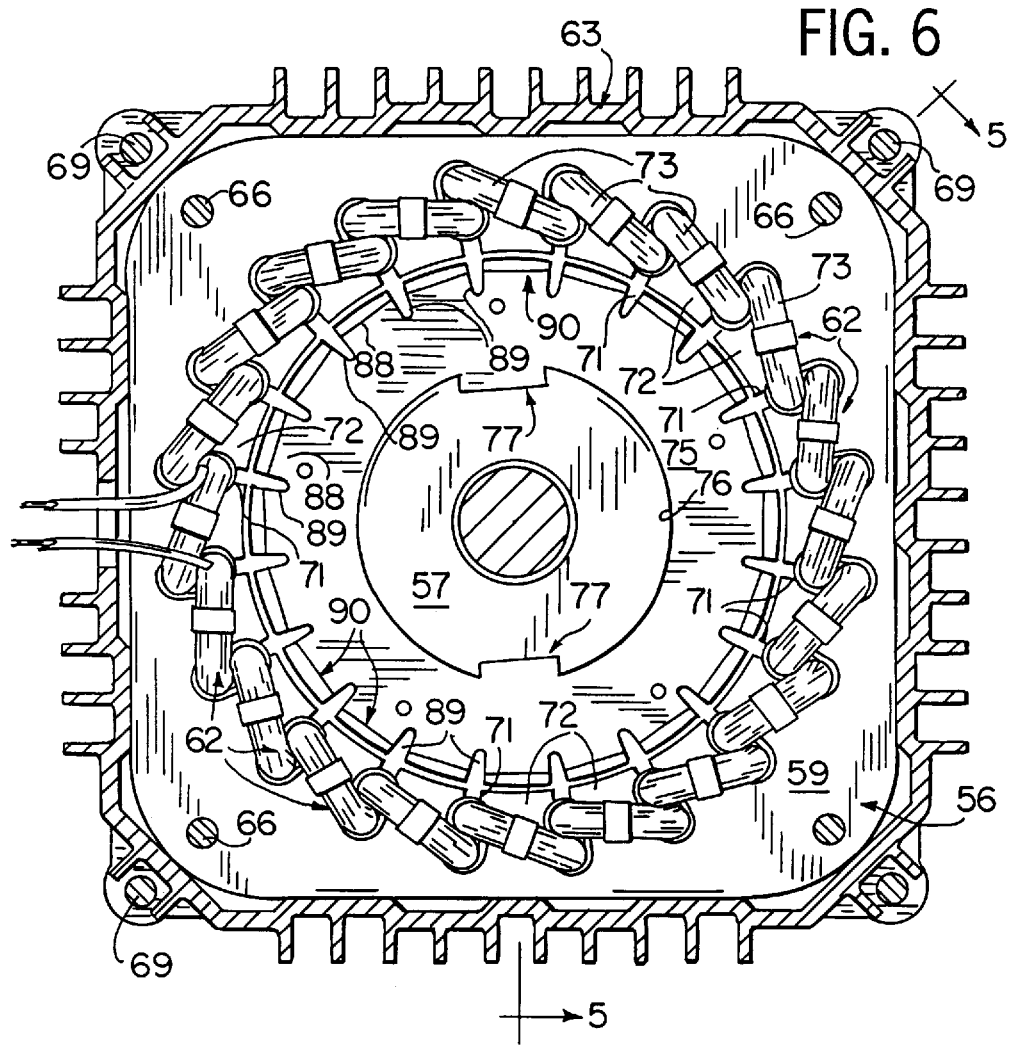
FIG. 6 is a sectional view of the generator assembly shown in FIG. 5 taken along line 6—6 in FIG. 5.
Figure 7:
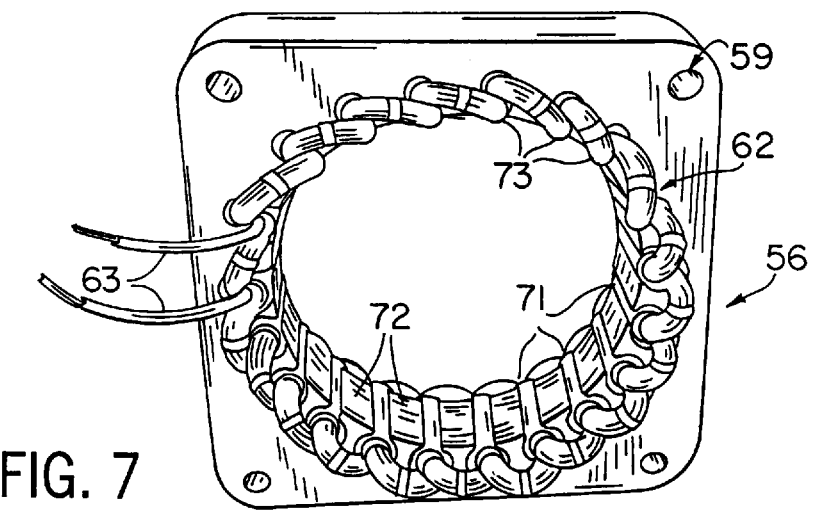
FIG. 7 is a perspective view of a stator that is used in the preferred alternator assembly shown in FIGS. 5 and 6.

More particularly, a preferred PMG alternator assembly is illustrated in FIGS. 5–7 including the four dedicated alternator units 56 and related stator units 59 and rotor units 60 in a preferred construction. Referring to FIG. 5, the stator units 59 of the four alternator units 56 are mounted in axially spaced relation to each other within a supporting outer frame 63 between opposite end frames 64 and 65. In the illustrated embodiment of the invention, each stator unit 59 includes a laminated annular stator core 61 and the cores are interconnected to each other by a plurality of circumferentially spaced connecting bolts 66. Each bolt is an elongated bolt member passed through aligned openings in the stator cores 61. In the illustrated embodiment, the cores 61, as shown in FIG. 6, have a substantially rectangular face configuration and the mounting openings are located in the four corners thereof. Spacers 67 (FIG. 5) are located between the adjacent cores 61 on the bolt 66. Clamping nuts 68 are secured to the opposite ends of the bolt abutting the end cores 61 and securely clamp and support the stator cores in a fixed spaced relation within the housing 63.

The end frames 64 and 65 are secured to each other and to the frame 63 define a supporting outer alternator frame structure. The frame 63, as shown in FIG. 6, is shown as a generally square finned frame and the end frames overlap the ends thereof. The frame and core structure may be readily constructed as mating round members. Clamp bolt and end nut units 69 (FIG. 5) pass through extensions of frames 64 and 65 to securely interconnect the members. The end frame 65 is secured to the engine wall 69a and supported therefrom. Suitable mounting members 70 are integrally formed on the end frame structure 64 and provides for mounting within the trailer unit or other mobile unit.

Referring to FIGS. 6–7, the laminated annular core 59 includes a plurality of equicircumferentially distributed winding slots 71 on the inner peripheral surface of the core and define a pole 72 between each pair of adjacent slots. The winding 62 is wound within the stator slots 71 and connected to the output leads 63 to provide an appropriately alternating voltage output of a selected frequency. The winding 62 includes a plurality of individual coils 73 each wound in adjacent slots 71 and thereby spanning a stator pole 72. Each coil 73 is wound with substantially greater numbers of turns then in conventional alternator designs and directly produces the designed high ballast level impedance of the same nature as the various separate current limiting impedance heretofore produced.

The illustrated rotor 60 of the preferred embodiment also includes a laminated core 75 (FIG. 5) with a central shaft opening 76 having a diameter corresponding to the outer diameter of the rotor shaft 57. The rotor 60 is connected to the shaft 57 by individual keyway 77 connections, as illustrated in FIGS. 5 and 6. The rotors 60 are mounted to the shaft 57 in alignment with each related stator core 61. Snap rings 78 are located in recesses in shaft 57 at the face of the rotors 60 to properly establish alignment, while maintaining effective isolation between the separate alternators units.

The rotor shaft 57 is mounted at the end frame 64 in suitable rotary bearing structure 81 and secured at the opposite end frame 65 to the output shaft 83 of the engine, as at 84. Thus, a bolt 85 extends through a center shaft opening 86 and threads into a conical clamp member 87 secured to the end of shaft 83. Tightening of bolt 85 firmly clamps the rotor unit to shaft 83.

The rotor 60, as shown in FIGS. 5 and 6, is generally constructed in accordance with the teaching of applicant's previously identified copending application. The laminated core 60 includes a plurality of equicircumferentially spaced poles 88 defined by spaced narrow end slots 89. Each pole 88 has a circumferential length essentially identical to the width of the stator poles 72 and thereby the opening of an aligned winding coil 73. A magnet unit 90 is embedded within each rotor pole 88. As more fully disclosed in the copending application, each magnet unit 90 includes a permanent magnet 91 secured within each rotor pole structure, with a special interposed shim 92 between the magnet and the pole base for purposes of improving the magnetic flux path through the stator and producing an improved output signal. Each magnet 91 substantially extends between the adjacent stator slots 89 and is radially polarized to create a magnet flux passing radially through the aligned core structures and into coupling engagement with the aligned stator coil.

As more fully developed in the corresponding copending application, the magnet unit 90 including the magnet 91 and shim 92 is encased within the side walls and inner and outer walls of each rotor pole. The wall structure is such that saturation occurs therein, but is not such as to shut down the magnet flux path. The shims 92 basically function as a filter for the harmonic components of the output. As a result, a highly desired, magnetic flux field is produced for optimal interaction with the aligned stator coils 73.

Although such a preferred construction is illustrated and disclosed, any other suitable permanent magnet rotor structure may be used to provide the appropriate magnetic flux pattern to the multiple wound stator. In the illustrated embodiment of the invention, the rotor 60 and the stator 59 are constructed with twenty circumferentially distributed poles. The stator winding 62 includes twenty separate and independent coils 73 wound and interconnected to each other to develop an output at the output leads 63.

The alternator assembly was used to energize metal halide lamps, the twenty pole/coil arrangement generated a 500–550 hertz frequency output with a no load output voltage of 450 to 530 RMS volts. Each coil 73 is specially wound with a substantial number of turns, typically 55, to produce an increased impedance and particularly to produce a high impedance directly related to functioning as a ballast impedance for operating of the metal halide lamps.

As previously discussed, the present invention provides advantageous results at essentially all frequencies because of the wave shape at the higher frequencies. It is known that at the higher frequencies, the size of the alternator can be decreased and may provide a more cost effective alternator assembly, particularly for mobile units.

The high frequency output voltage and current established by the described structure included the desired rapid passage through zero of the AC voltage wave to establish and maintain the current after the initial striking thereof.

In the illustrated embodiment of the invention, a separate dedicated alternator unit 59 is provided for each lamp 24 and is connected directly thereto. This has been found to provide a particularly simple and reliable system for directly generating a high frequency, alternating current supply for direct connection to the lamp, without the necessity for interposing other ballast components into the system with appropriate design of the generator windings.

In a test alternator, each coil was wound with 55 turns in contrast to a conventional alternator which might typically have 33 turns. The stator core was generally square with a width and height of about 6½ inches. the total length was about 18 inches. The rotor diameter was about 4½ inches with an air gap between the stator and rotor poles. The PMG alternator assembly was thus a compact assembly of approximately 17 inches long and 9 inches square. The test alternator assembly, as illustrated and as constructed, had an open circuit voltage of approximately 500 volts RMS. The lamps were 1000 watts metal halide lamps requiring approximately 450 RMS volts for initial striking. The rotor was driven at no-load speed of 3300 RPM. The open circuit voltage dropped to the range of 450 to 475 volts at approximately 3100 RPM as the lamps ignited. The voltage decreased to about 220 to 240 volts, as the sustaining voltage and the RPM of the unit settled at substantially 3000 RPM.

FIGS. 8–11 show the characteristic of the alternator assembly of FIGS. 5–7 described above, in comparison with a conventional 60 hertz power system using a conventional large separate ballast including an autotransformer and inductance system. Thus, the single alternator assembly had the four separate output stator windings connected directly to four individual metal halide lamps 24. The same lamps were used with the conventional 60 hertz power supply.

Figure 8:
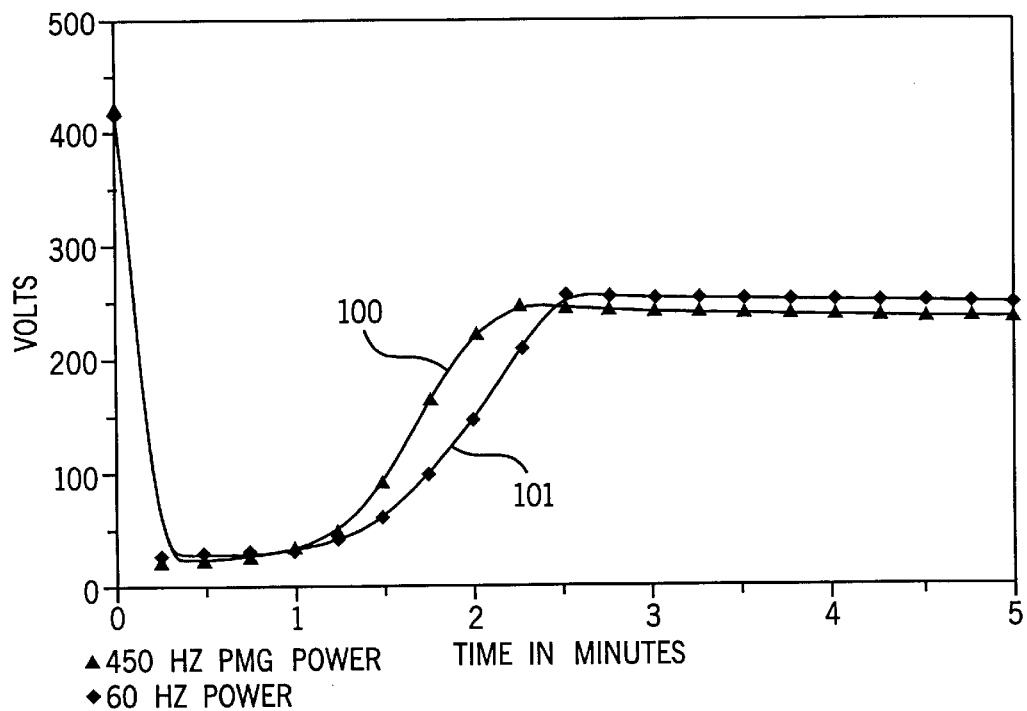
FIG. 8 is a graph depicting lamp voltages with respect to time in the lighting system with the illustrated embodiment and a convention 60 Hz power supply.

As illustrated in FIG. 8, for example, the lamp voltage 100 and 101 shows an open circuit voltage of slightly over 400 volts prior to striking of the turn-on arc and sufficient to strike the connected lamp(s) 24. Upon striking of the lamps, the lamp voltage dropped immediately to less than 50 volts and substantially maintained, with a slight increase during the initial striking of the lamps, after which the voltage slowly increased to the sustaining level of approximately 250 volts. The curves for the two power supplies track quite closely.

Figure 9:
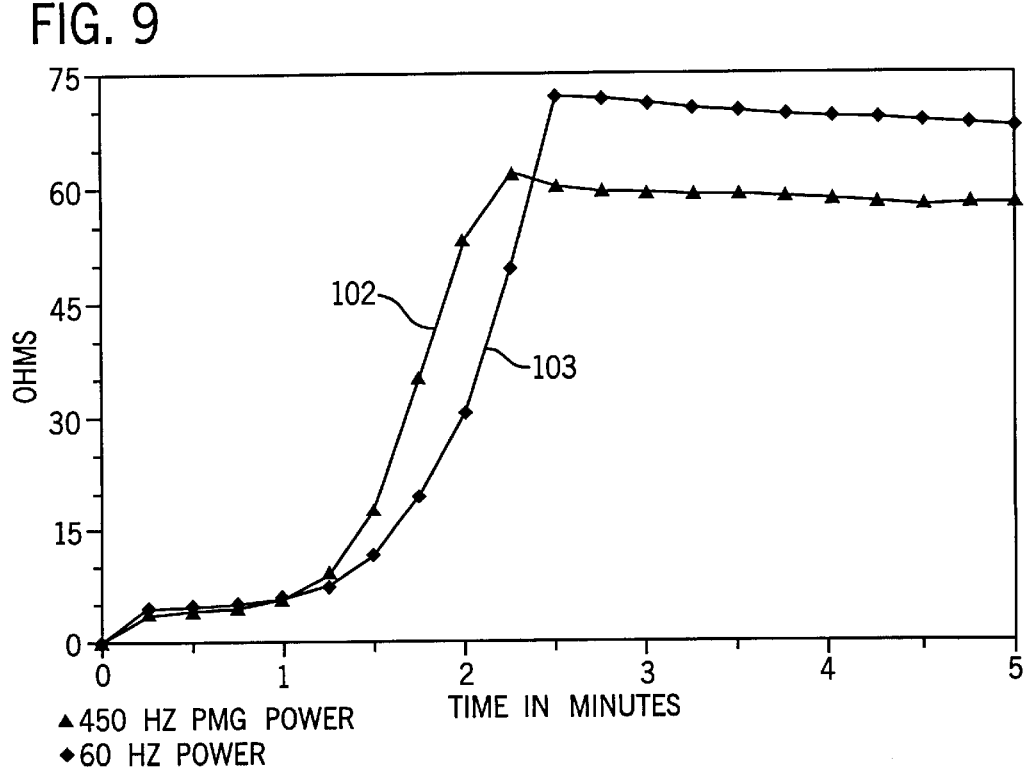
FIG. 9 is a graph similar to FIG. 8 and depicting lamp impedances with respect to time.

FIG. 9 illustrates the change in the apparent lamp impedance characteristics of the two supplies over the same period as FIG. 8. The impedance, as shown by curves 102 and 103 slowly rises during the striking of the lamps and then rapidly rises as the lamps reach their full sustaining level of voltage and current. The apparent impedance of the permanent magnet alternator supply is slightly less than that of the conventional 60 hertz power supply, but still supplies the necessary impedance for limiting of the current.

Figure 10:
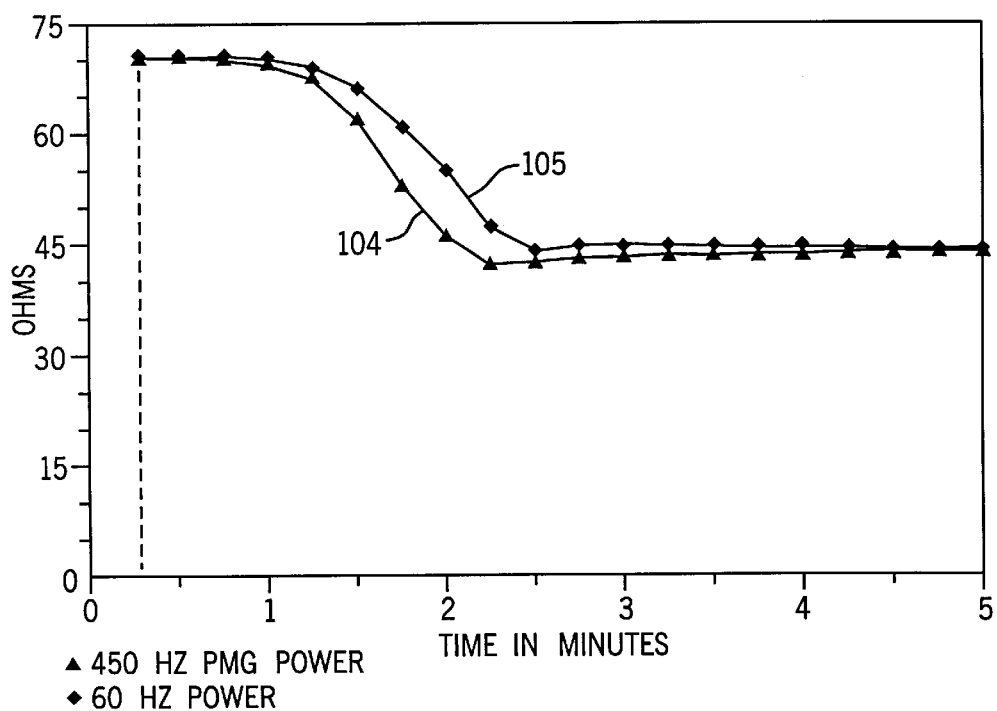
FIG. 10 is a graph similar to FIG. 8 and depicting source impedances with respect to time.
Figure 11:
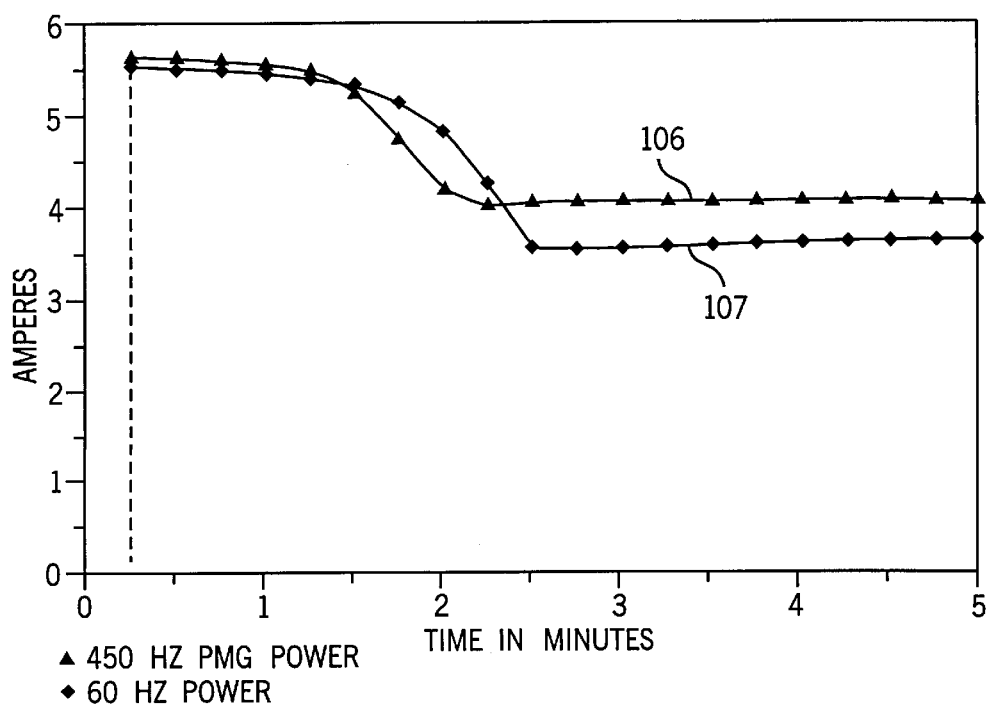
FIG. 11 is a graph similar to FIG. 8 and depicting lamp currents with respect to time.

FIG. 10 illustrates corresponding change curves 104 and 105 of the apparent source impedance with respect to time and showing the close tracking of the alternator impedance with the conventional 60 Hz combination supply ballast. Comparing FIGS. 9 and 10, the source impedance is at a high level during the striking while the lamp impedance is low, and then the source impedance gradually drops to a current limiting impedance related to the increased lamp impedance, and maintains the necessary limited current during operation of the lamps. The lamp current is illustrated by curves 106 and 107 in FIG. 11, which generally follow the characteristic of the impedance as shown in FIG. 10. In fact, the lamp curve 106 for the alternate source illustrates a somewhat higher final current level.

Figure 12:
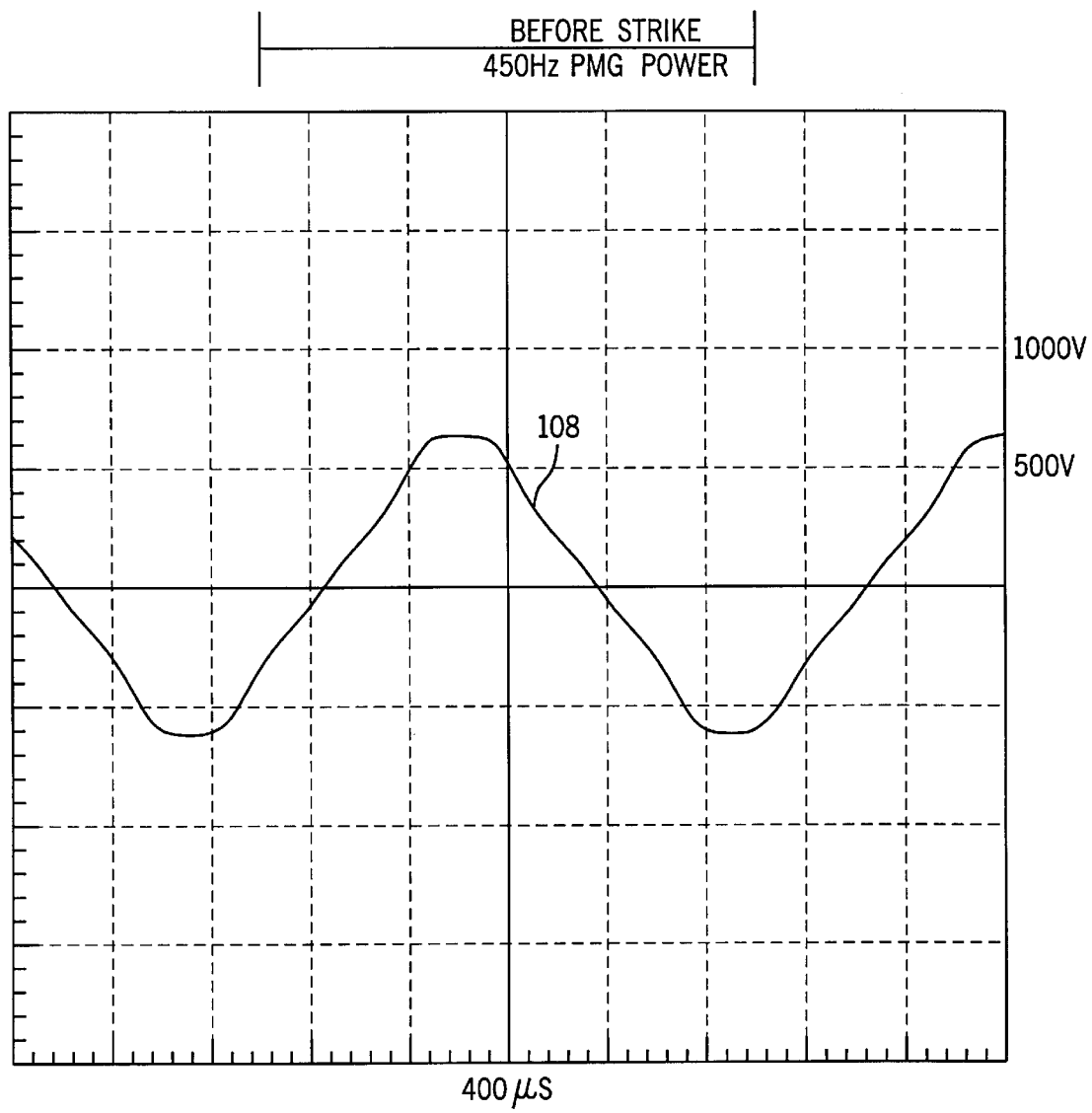
FIGS. 12–14 depict the voltage and current wave shapes of the illustrated embodiment.
Figure 13:
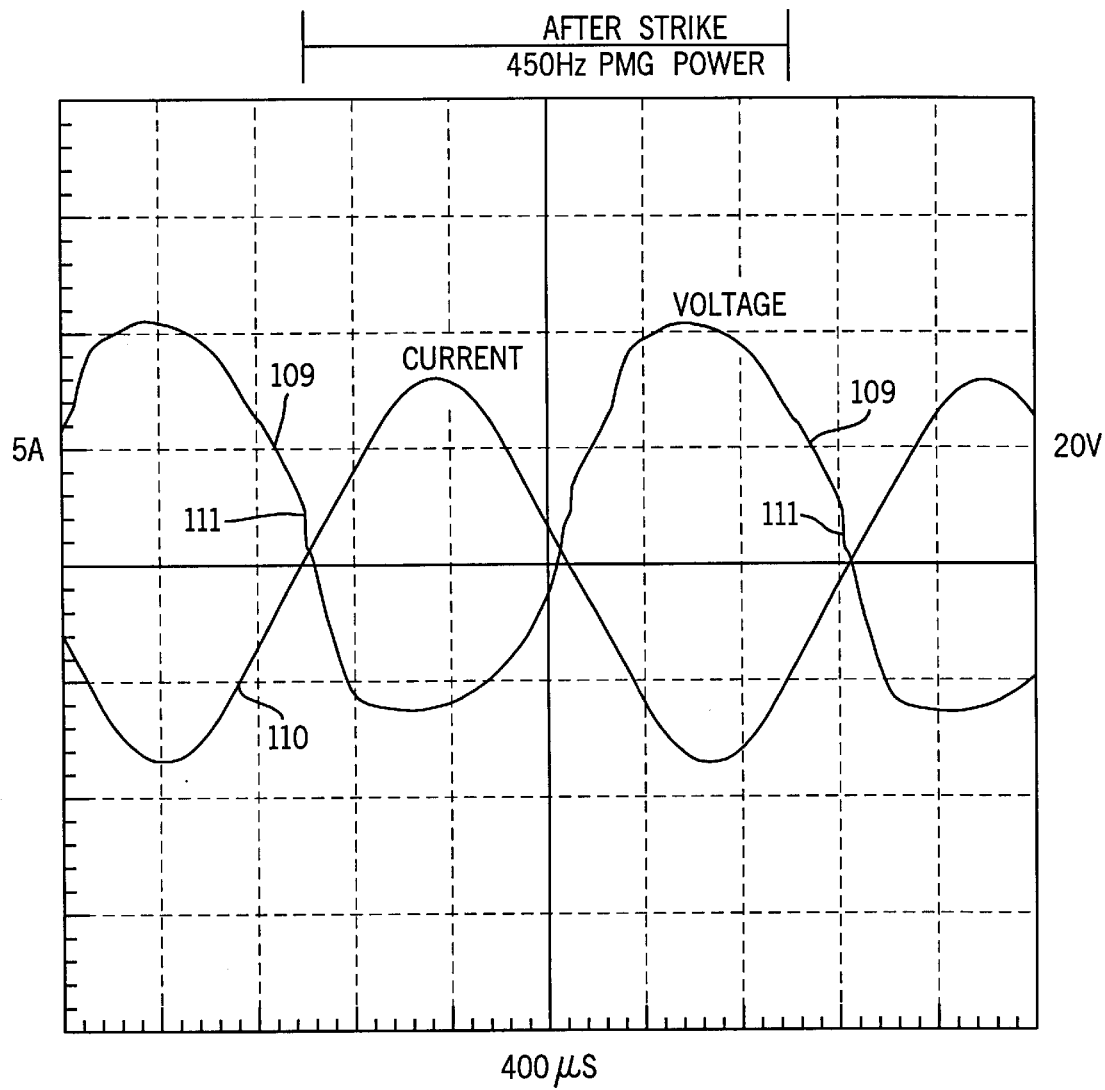
Figure 14:
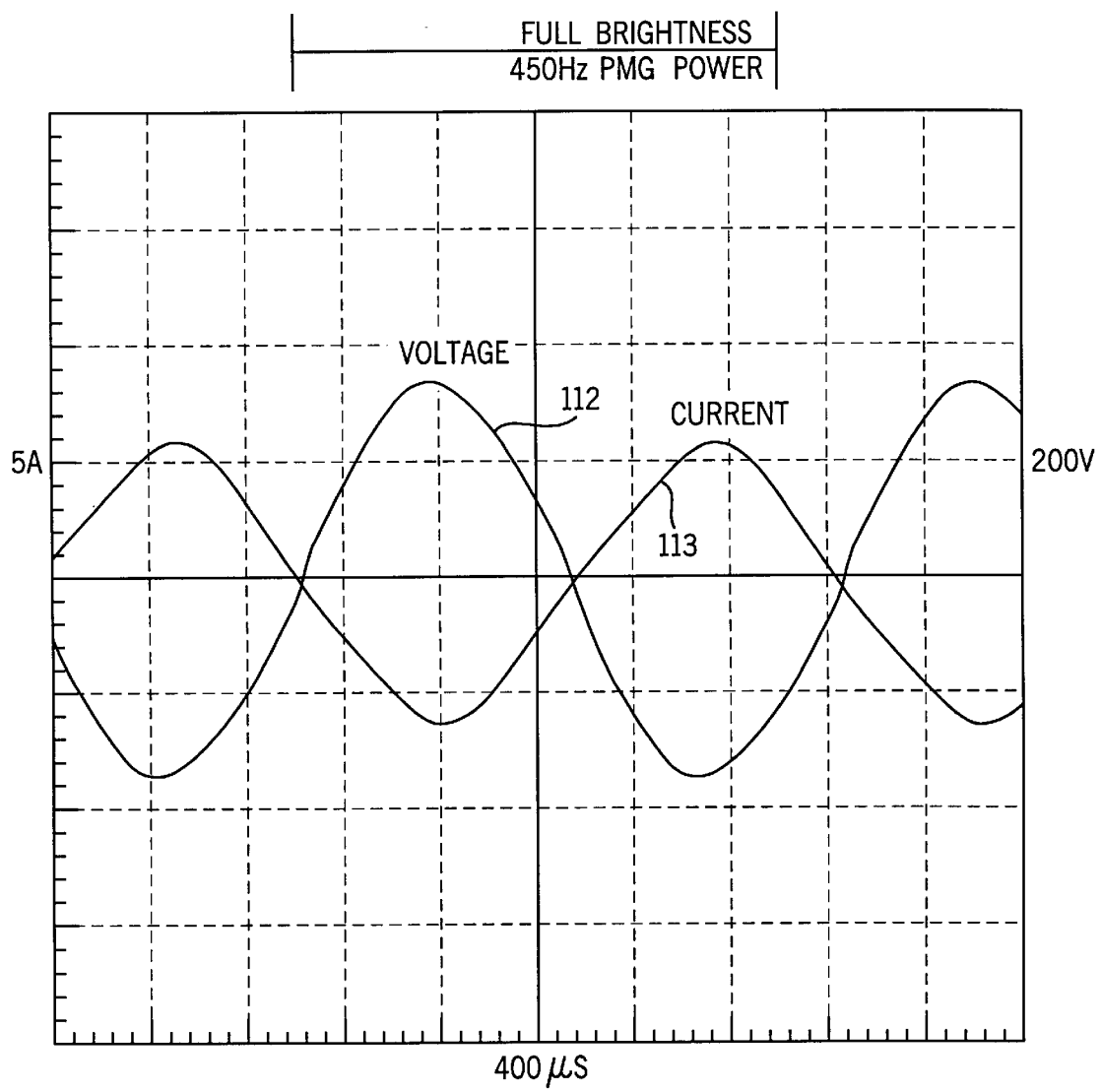

FIGS. 12–14 illustrate the voltage and current wave shapes of the alternator output at the respective times during ignition and the final sustaining state. FIG. 12 is a curve 108 illustrating the open circuit output voltage waveform for striking the arc for lamp turn on. The voltage peak is just over 600 volts peak at 450 Hz. FIG. 13 illustrates the voltage and current waveform 109 and 110 following the initial turn-on of the lamps, on a different scale and showing a 40 volt peak and approximately 8 amp current flow. The voltage and current waves of FIG. 13 are shown 180° out of phase. This resulted from the connecting of the oscilloscope to the output of the alternator and the input to the lamp. In fact, the waves are essentially in phase. The illustration provides a convenient illustration of the voltage and current waves with respect to establishing and maintaining of the high intensity lamps or similar loads.

The voltage wave shape has changed to include a substantially vertical portion 111 at the zero crossing of the current wave 110.

FIG. 14 illustrates the voltage and current wave 112 and 113 with full lamp turn on, on a different scale, for full brightness state of the lamps. The voltage is substantially 340 volts peak and the current is substantially 6 amps peak, with the voltage passing rapidly through the zero crossing with the current. Thus, clearly there is no interruptions of the current, with the desired current limiting thereof.

The permanent magnet alternator assembly has been found to produce a particularly satisfactory, practical embodiment, with the multiple individual alternator units interconnected as an assembly to a common drive for operating a bank of high intensity lamps as disclosed. The system is particularly cost effective while producing outstanding results with direct connection of the output windings to the lamps and relying solely on the inductive impedance characteristic of the alternator units to provide the strike voltage, the sustaining voltage and the internal current limiting impedance.

The direct connection without the necessity of any added components is particularly and surprisingly operative to produce a mobile supply system at least equal to the typical prior art systems with the separate ballast device, which are generally more complex units as well as large and costly constructions. However, various auxiliary connections might be provided for modifying the overall characteristic of the improved high frequency alternator supply with the inherent impedance characteristic. For example, if the particular lamp characteristic is such that the operative impedance of the alternator unit does not match the optimal specification for a particular lamp, a small modifying ballast, such as a lag ballast or other inductance/capacitance ballast may be interconnected between the output of the alternator and the lamp to produce the desired optimal impedance characteristic. Such modification, however, should require a less costly and complex modifying impedance device than the complex and heavy ballast devices heretofore required. Thus, the present invention has been found to particularly eliminate the necessity for the more complex inductive capacitance systems such as typically recommended for use with metal halide lamps and the like, but does not prevent the use of auxiliary elements in the supply connection to the lamps.

Although the dedicated alternator units, as illustrated, produced a highly cost effective system, an alternator assembly may be readily provided in which a stator is wound with an appropriate plurality of individual dedicated stator windings, one for each of the lamps to be energized. The windings necessarily must be isolated from each other to essentially act as an independent winding with respect to the magnetic flux created by the rotor and the interaction of the windings therewith. Thus, appropriate phase displacement of the windings so as to effectively produce isolated outputs for each of the windings will, for example, permit the desired controlled voltage and current applied to the individual lamps.

Although the illustrated embodiment of the invention includes an optimal construction including permanent magnet alternators of a unique construction, any other alternator, which provides for the high frequency output and the inherent internal impedance characteristic required for energizing of high intensity lamps and the like, can be used in accordance with the teaching of the present invention by those skilled in the art.

Figure 15:
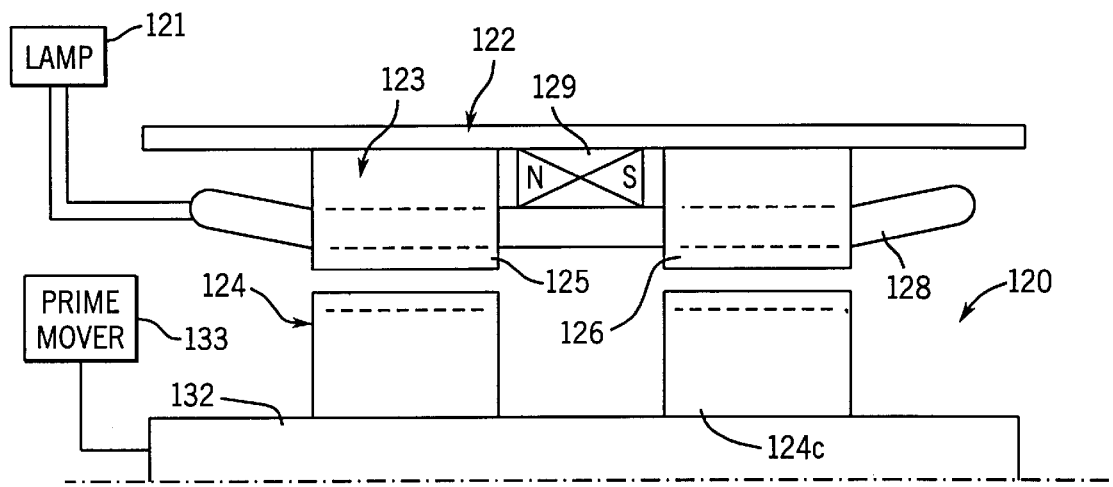
FIG. 15 is a diagrammatic illustration of a portion of a switched reluctance alternator.
Figure 16:
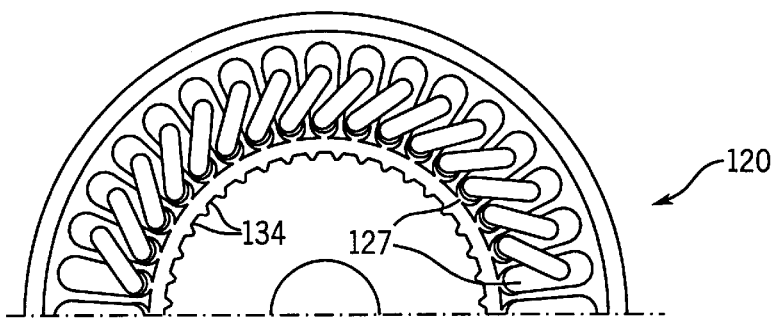
FIG. 16 is an end view of FIG. 15.
Figure 17:
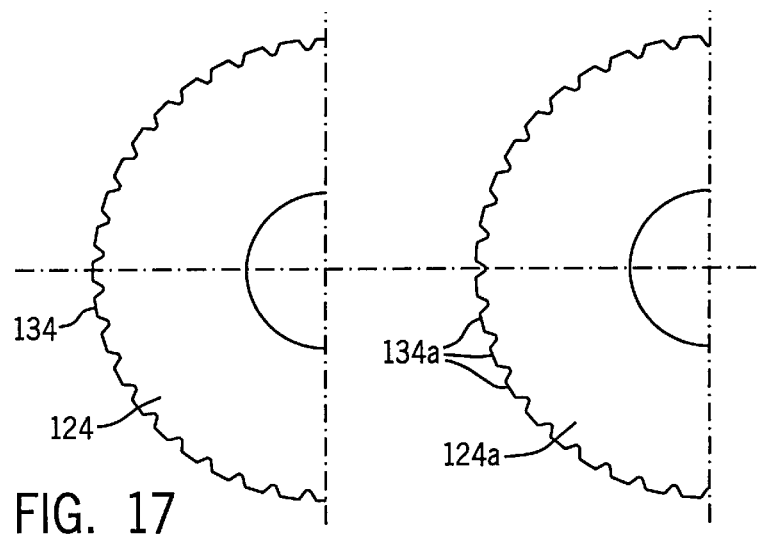
FIG. 17 is a separate view illustrating orientation of rotor components shown in FIGS. 15 and 16.

Referring particularly to FIGS. 15–17, a switched reluctance or homopolar alternator 120 is illustrated of a construction for driving of HID lamps 121. The alternator 120 includes an outer housing 122 within which a stator assembly 123 and a rotor unit 124 is mounted. End frames, not shown, are secured to housing 122 to support the rotor 124. The stator unit 122 includes spaced annular stator cores 125 and 126, each having correspondingly equicircumferentially spaced slots 127, as shown in FIG. 16. A single stator output winding 128 is wound in the equicircumferentially spaced and aligned slots of the stator cores 125 and 126. The winding 128 consists of a substantial plurality of individual coils (FIG. 16), each of which is wound with a relatively high number of turns compared to the conventional winding for alternators. This, again, establishes a high impedance output winding 128 and provides the inherent impedance characteristic for providing direct ballast characteristic for interconnection of the winding to HID lamp 121 or the like. The coils each span the adjacent slots in the illustrated embodiment to define a stator pole. The number of coils, again, is related to the output frequency to be generated and preferably will provide an output in the range of 200 to 600 Hz. Any other frequency can be provided depending upon the lamp characteristics and other variables which can be introduced into the system while maintaining the inherent ballast characteristic in the winding.

Mounted between the cores 125 and 126 is an annular D.C. magnet unit 129 which substantially spans the space therebetween. The magnet unit 129 may be a permanent magnet or suitable polarized coil member driven from a suitable D.C. source, such as a 12 volt battery or other suitable D.C. field or energy source. The permanent magnet 129 is axially or longitudinally polarized with a north pole and south pole, as diagrammatically illustrated by the letters "N" and "S". It thus establishes a flux which passes through the stator cores 125 and 126 with the path completed through the rotor unit 124 assembly of the alternator.

In accordance with known construction, the rotor unit 124 includes a pair of spaced rotors 130 and 131 mounted on a driven shaft 132, which is coupled to a suitable prime mover 133 to simultaneously rotate the spaced rotors. Each rotor is identically constructed as diagrammatically illustrated in FIGS. 16 and 17. Thus, each is a single solid member formed of a suitable magnetic material and having a plurality of integrally cast or formed teeth 134. Each tooth 134 is formed of a circumferential width and spacing corresponding to stator slots and coils of the output windings 128. The rotor is keyed to the driven shaft 132. The second rotor 124a is identically constructed and keyed to the driven shaft 132. However, the teeth 134a are offset by the width of the rotor poles, as shown by the center line 135, in FIG. 17.

The output is an alternating output voltage. The output is a sine wave which passes through zero. The output wave shape results from a changing flux field, which is biased above zero, with the resulting voltage and current. Such alternator is well known to be particularly useful in high frequency alternators because of the rugged rotor structure. It thus allows driving of the rotor at very high speeds.

By appropriate winding construction, that is, with a suitable number of winding turns and proper selection of the magnetic member, a high impedance winding is readily constructed within an inherent impedance characteristic and providing a ballast characteristic suitable for direct connection to the lamp.

Still other systems, such an induction alternators of a well known construction, will also produce a suitable high impedance output for application in the present invention. A conventional induction motor is schematically illustrated in FIGS. 18–21 for driving of a lamp.

Figure 18:
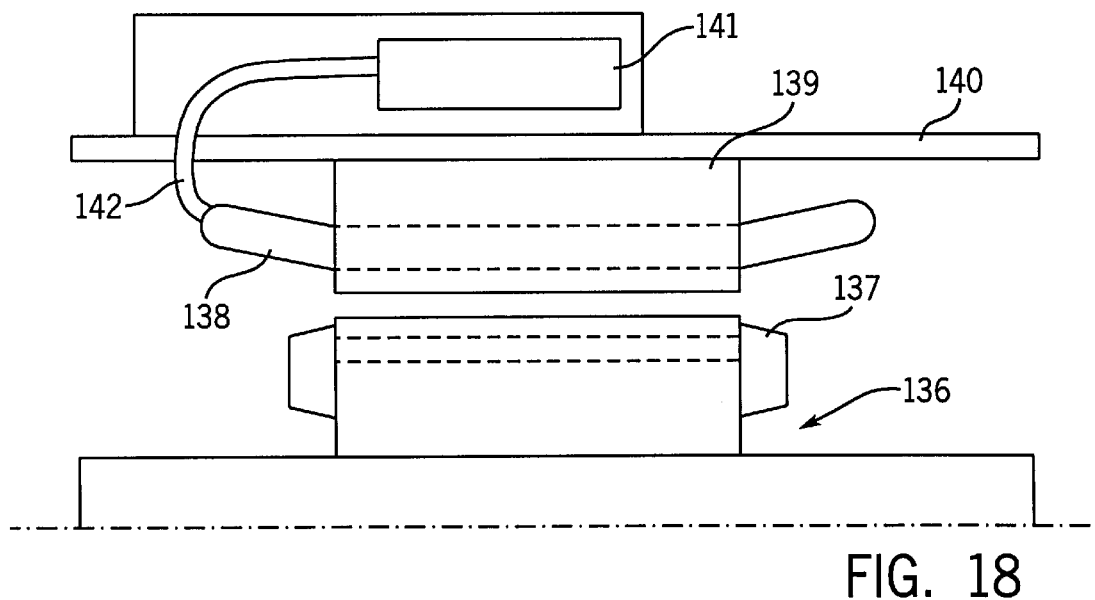
FIG. 18 is a view similar to FIG. 15 of an induction alternator.
Figure 19:
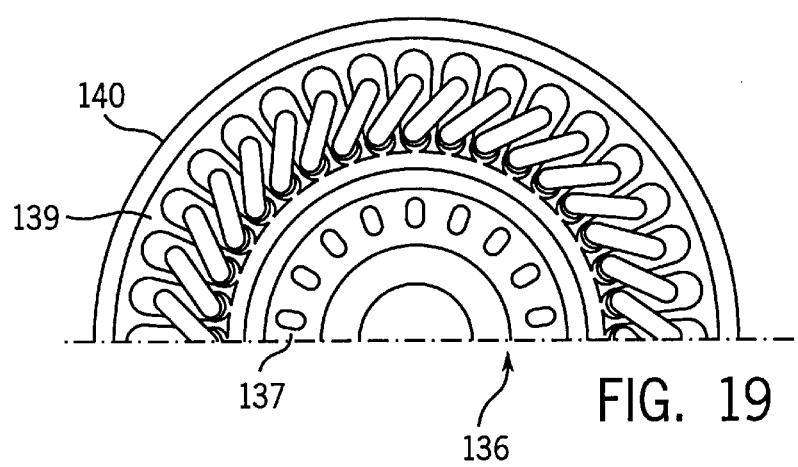
FIG. 19 is an end view of the alternator shown in FIG. 18.
Figure 20:
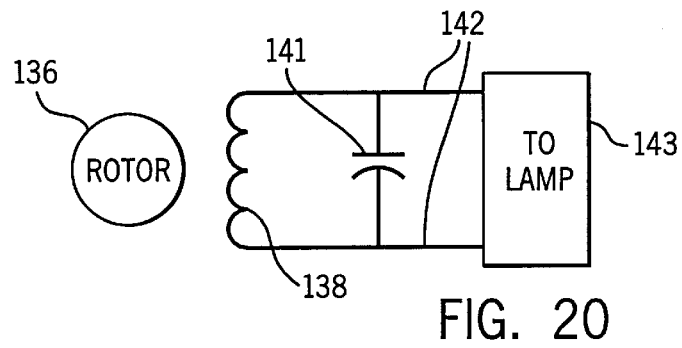
FIG. 20 is a schematic drawing of a circuit of the induction alternator as shown in FIGS. 18 and 19.
Figure 21:
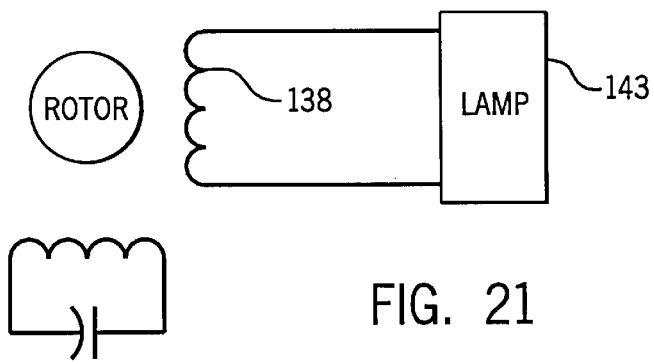
FIG. 21 is an alternate schematic circuit drawing of an induction alternator.

Referring to FIGS. 18 and 19, the alternator unit includes a rotor unit 136, shown diagrammatically as a squirrel cage-type construction, adapted to be driven at high speed and having circumferentially spaced and interconnected conductors 137. A stator winding 138 is wound as an annular stator core 139 and mounted within housing 140. A capacitor 141 is connected across the winding output leads 142, which are connected directly to a lamp 143. The parallel capacitor creates the excitation to the generator, with the combination of the winding and the capacitor creating a high impedance. The winding and capacitor should be selected and specified to produce the particular desired high impedance characteristic. Thus, the winding and capacitor introduce an inductive and capacitive reactance into the total impedance characteristic, which can be readily designed in accordance with known technology to produce the desired output voltage and current, and in particular, an impedance characteristic to establish the inherent lamp ballast output as well as the high start voltage and the reduced sustaining voltage. The winding 138 is wound with a plurality of individual coils, as shown FIG. 19, connected in series to provide an appropriate output voltage and frequency for driving of lamps 143. The stator winding 138 is wound as a single winding as shown in FIG. 20, or alternatively, with a main winding 138a and an auxiliary quadature winding 144, as shown in FIG. 21. In the first construction of FIG. 20, a capacitor 141 is connected across the main winding 138. In the alternate construction, the capacitor 141 is placed across the auxiliary winding 144 as shown in FIG. 21. In both winding arrangements, the main winding 138 is wound with the inherent ballast impedance for driving of the lamp, preferably without the necessity of any intermediate ballast control and thereby permitting the direct connection of the main winding to the lamps through, of course, appropriate switching devices.

Figure 22:
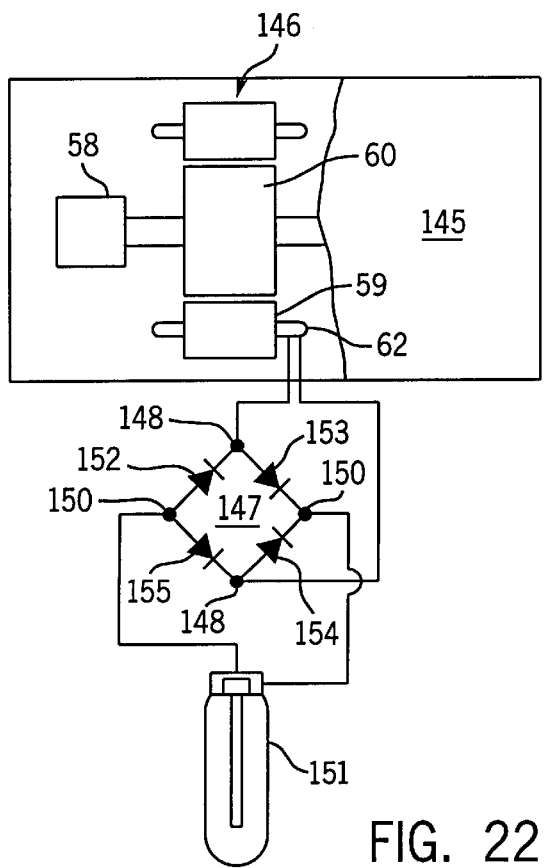
FIG. 22 is a simplified illustration showing a further embodiment employing a direct current output supplied to the lamp.

FIG. 22 illustrates an embodiment providing a direct current output. The alternator assembly 145 is shown in block diagram, with single alternator unit 146 shown. The assembly may of course be constructed in accordance with the prior teaching with additional alternator units or with one having a plurality of output windings establishing the inherent ballast characteristic as heretofore discussed. The significant change is the connection of the output winding of the alternator unit connected through a full wave bridge rectifier 147. Thus, the output current to the lamp is a direct current with the necessary impedance produced by the inherent ballast construction of the alternator unit as in the prior embodiment.

In the embodiment of FIG. 22, the full wave bridge rectifier 147 is illustrated as a diode bridge having input terminals 148 connected to the output winding 62. Output terminals 150 are connected directly to the lamp 151. The bridge rectifier includes four diodes 152–155 interconnected between the input and output terminals 148 and 150 such that the current flow is always a uni-directional flow to the lamp. Thus, the diodes 152–155 establish conduction, in the illustrated embodiment of the invention from the upper input terminal 148 to the output line shown to the right during the positive half cycle and from the lower input terminal 148 during the negative half cycles as a result of the polarization of the diodes.

The alternator assembly again can include a single alternator unit as shown, any plurality of alternator units, or a single alternator unit with a plurality of phase isolated output windings and the like. The rectification of the alternator output to supply a direct current to the lamp avoids the necessity of the special AC sustaining voltage characteristic required in a totally alternating current system.

In addition, the invention may use a synchronous wound alternator in which the winding is wound as a full pitch winding on the rotor. The synchronous wound generator will particularly provide an output consisting of a main drive frequency including only odd harmonics and thereby developing a square wave output voltage. The high impedance winding produces the square voltage producing an essentially steep voltage change at the zero current reference and thus provides a voltage particularly adapted for maintaining of the current flow through the high intensity type lamp. The impedance and voltage characteristic is that for maintaining the limited current flow without interruptions through the current reversal location or point in the alternating current output. Even a shunt wound machine may be used with an appropriate field control to control the field excitation and thereby the effective impedance with the voltage change and further also limiting the current. Further, the engine could be constructed and/or controlled to produce the droop characteristic of the alternator and thereby the respective starting and full powering of the lamp.

The present invention particularly is directed to the special alternator assembly with an inherent impedance characteristic for driving of lighting systems and particularly with the impedance characteristic constituting a ballast impedance characteristic for the lighting system as well as providing the strike voltage and the sustaining voltage.

We claim:

1. An alternating current lighting system comprising at least one A.C. lamp requiring an alternating current and having a minimal operating impedance, an alternator assembly having at least one alternating power current output connected to supply alternating current power to the lamp, said alternator assembly including a winding connected to said lamp and having an inherent impedance characteristic for limiting the current to said lamp and for maintaining lamp operation without any separate impedance.

2. The alternating current lighting system of claim 1 wherein said alternator assembly includes a plurality of alternating units, each said alternator unit including a separate rotor and output winding and each output winding adapted to energize said one of said lamps.

3. The alternating current lighting system of claim 1 wherein said lamp is a high intensity lamp requiring a sustaining voltage for maintaining of current between a pair of spaced electrodes for generating output light, said winding having an alternating current voltage output having a sustaining voltage substantially at the zero crossover of current to maintain full lamp-on operation.

4. The alternating current lighting system of claim 1 wherein said lamp is a high intensity lamp requiring a sustaining voltage for maintaining of current between a pair of spaced electrodes for generating output light, said winding having an alternating current sustaining voltage output including a relatively steep voltage change substantially at the zero crossover of current and thereby maintaining full lamp-on operation.

5. The lighting system of claim 1 wherein said inherent impedance characteristic for limiting of the current, creates strike voltage to initiate turn-on of the lamp and thereafter a sustaining voltage to maintain operation of the lamp.

6. The lighting system of claim 1 including a mobile support, an internal combustion engine connected to drive said alternator, said engine and said alternator assembly being mounted to said mobile support.

7. The lighting system of claim 1 wherein said impedance characteristic of said alternator assembly substantially corresponding to a separate stationary ballast adapted for connecting of the lamp to a 60 hertz source.

8. The lighting system of claim 1 including a plurality of high intensity lamps each having an arc struck between a pair of spaced electrodes to establish an illuminating current flow, said alternator assembly including a separate dedicated alternator unit for operating of each lamp, each alternator unit providing independent electrical alternating current output voltage and current and adapted for direct connection to one of said lamps and having a winding impedance to limit the current in said lamp and to establish a strike voltage to initiate operations of the lamp and a sustaining voltage to maintain operation of the lamp.

9. The alternating current lighting system of claim 1 wherein the electrical alternating current output has an output frequency greater than 60 hertz.

10. The lighting system of claim 1 wherein the output has an output frequency substantially greater than 60 hertz.

11. The lighting system of claim 1 wherein the alternating current output has a fundamental frequency in a range of 200–600 hertz.

12. The lighting system of claim 9 wherein the operating range is 500–550 hertz.

13. The lighting system of claim 1 wherein the alternator assembly includes a permanent magnet alternator unit having a permanent magnet rotor including a plurality of equicircumferentially spaced permanent magnets.

14. The lighting system of claim 13 wherein said rotor includes circumferentially distributed rotor teeth, permanent magnet unit embedded within each rotor tooth including a radially polarized magnet and a flux modifying shim in series and abutting of the permanent magnet and modifying the flux flow.

15. The lighting system of claim 13 wherein the permanent magnet alternator includes a stator having a plurality of equicircumferentially spaced coils corresponding to the permanent magnets of the alternator.

16. The lighting system of claim 15 wherein the alternating current output has a fundamental frequency in the range of 200–600 Hz.

17. The lighting system of claim 16 wherein the operating range of the fundamental frequency is 500–550 Hz.

18. The alternating current lighting system of claim 15 wherein the permanent magnet alternator has a plurality of permanent magnets embedded in a round core and defining magnetic poles and said stator has a corresponding coils, said each coil spanning a circumferential space corresponding to the circumferential length of each rotor pole, and wherein each coil has a substantial like number of turns, said coils being connected in series of said alternator, said rotor rotating at a speed to generate an output frequency greater than 60 hertz for operating of metal halide lamps.

19. The alternating current lighting system of claim 18 wherein said alternator is rotated to establish a frequency output signal in the range of 200–600 Hz.

20. The alternating current lighting system of claim 1 wherein the lamp is a high intensity lamp having a pair of spaced arc electrodes requiring a substantial initial strike voltage and a significantly lower sustaining voltage, said alternator unit inherently directly establishing said voltage characteristic.

21. The alternator current lighting system of claim 20 wherein the lamp is a metal halide lamp.

22. The lighting system of claim 1 wherein said alternator assembly includes a switched reluctance alternator unit including said output winding.

23. The lighting system of claim 1 wherein said alternator assembly includes an induction alternator including said output winding, and a capacitor connected across said output winding.

24. The lighting system of claim 1 wherein said alternator assembly includes an induction alternator includes said output winding, a quadature winding, and a capacitor connected in parallel with said quadature winding.

25. In a lighting system having at least one lamp, a method of providing electrical alternating current power to the lamp comprising the steps of:

providing an electric alternator to provide an open circuit A.C. voltage sufficient to initiate conduction of a lamp and a sustaining output A.C. voltage to maintain current flow after said initiated conduction, creating sufficient internal impedance within the electric alternator after initiating said conduction to limit the current supply to the lamp.

26. The method as recited in claim 25 wherein said internal impedance is a relatively large inductive impedance.

27. The method as recited in claim 26 wherein the electric alternator is a synchronous alternator and the relatively large reactance is created by providing stator coils having a large number of turns.

28. The method as recited in claim 25 wherein the electrical alternating current power provided to operate the lamp after striking the arc across the lamp has a frequency between 500 to 550 Hz.

29. The method as recited in claim 28 wherein the electrical alternating current power has a frequency between 500 to 550 Hz and is generated by:

providing a synchronous generator having a rotor with approximately 20 poles;

driving a rotor at approximately 3,000 RPM;

providing a stator within the generator having approximately 20 coils; and transmitting the electrical alternating current power from the stator coils to the lamp.

* * * * *